(12) United States Patent  
Lindholm et al.

(10) Patent No.: US 7,015,913 B1  
(45) Date of Patent: Mar. 21, 2006

(54) METHOD AND APPARATUS FOR MULTITHREADED PROCESSING OF DATA IN A PROGRAMMABLE GRAPHICS PROCESSOR

(75) Inventors: John Erik Lindholm, Saratoga, CA (US); Rui M. Bastos, Santa Clara, CA (US); Harold Robert Feldman Zatz, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 164 days.

(21) Appl. No.: 10/608,346

(22) Filed: Jun. 27, 2003

(51) Int. Cl.
*G06F 15/00* (2006.01)
*G06F 12/02* (2006.01)
*G06F 9/46* (2006.01)
*G06T 1/00* (2006.01)

(52) U.S. Cl. .................. 345/501; 345/543; 718/102; 718/104

(58) Field of Classification Search ............. 345/501, 345/504, 520, 522, 420, 423, 503, 519, 506, 345/543, 557; 709/208, 231; 712/23, 28, 712/31–32; 718/102, 104
See application file for complete search history.

(56) References Cited

U.S. PATENT DOCUMENTS

| | | | | |
|---|---|---|---|---|
| 5,818,469 A | * | 10/1998 | Lawless et al. | 345/522 |
| 5,946,487 A | * | 8/1999 | Dangelo | 717/148 |
| 6,088,044 A | * | 7/2000 | Kwok et al. | 345/505 |
| 6,753,878 B1 | * | 6/2004 | Heirich et al. | 345/629 |
| 6,765,571 B1 | * | 7/2004 | Sowizral et al. | 345/420 |
| 2003/0140179 A1 | * | 7/2003 | Wilt et al. | 709/321 |
| 2004/0160446 A1 | * | 8/2004 | Gosalia et al. | 345/503 |

* cited by examiner

Primary Examiner—Kee M. Tung
(74) Attorney, Agent, or Firm—Patterson & Sheridan, LLP

(57) ABSTRACT

A graphics processor and method for executing a graphics program as a plurality of threads where each sample to be processed by the program is assigned to a thread. Although threads share processing resources within the programmable graphics processor, the execution of each thread can proceed independent of any other threads. For example, instructions in a second thread are scheduled for execution while execution of instructions in a first thread are stalled waiting for source data. Consequently, a first received sample (assigned to the first thread) may be processed after a second received sample (assigned to the second thread). A benefit of independently executing each thread is improved performance because a stalled thread does not prevent the execution of other threads.

33 Claims, 9 Drawing Sheets

METHOD AND APPARATUS FOR MULTITHREADED PROCESSING OF DATA IN A PROGRAMMABLE GRAPHICS PROCESSOR

FIELD OF THE INVENTION

One or more aspects of the invention generally relate to multithreaded processing, and more particularly to processing graphics data in a programmable graphics processor.

BACKGROUND

Current graphics data processing is exemplified by systems and methods developed to perform a specific operation on several graphics data elements, e.g., linear interpolation, tessellation, texture mapping, depth testing. Traditionally graphics processing systems were implemented as fixed function computation units and more recently the computation units are programmable to perform a limited set of operations. In either system, the graphics data elements are processed in the order in which they are received by the graphics processing system. Within the graphics processing system, when a resource, e.g., computation unit or data, required to process a graphics data element is unavailable, the processing of the element stalls, i.e., does not proceed, until the resource becomes available. Because the system is pipelined, the stall propagates back through the pipeline, stalling the processing of later received elements that may not require the resource and reducing the throughput of the system.

For the foregoing reasons, there is a need for improved approaches to processing graphics data elements.

SUMMARY

The present invention is directed to a system and method that satisfies the need for a programmable graphics processor that supports processing of graphics data elements in an order independent from the order in which the graphics data elements are received by the programmable graphics processing pipeline within the programmable graphics processor.

Various embodiments of the invention include a computing system comprising a host processor, a host memory, a system interface configured to interface with the host processor, and the programmable graphics processor for multithreaded execution of program instructions. The graphics processor includes at least one multithreaded processing unit configured to receive samples in a first order to be processed by program instructions associated with at least one thread. Each multithreaded processing unit includes a scheduler configured to receive the program instructions, determine availability of source data, and schedule the program instructions for execution in a second order independent of the first order. Each multithreaded processing unit further includes a resource tracking unit configured to track the availability of the source data, and a dispatcher configured to output the program instructions in the second order to be executed by the at least one multithreaded processing unit.

Further embodiments of the invention include an application programming interface for a programmable graphics processor comprising a function call to configure a multithreaded processing unit within the programmable graphics processor to enable processing of samples independent of an order in which the samples are received.

Yet further embodiments of the invention include an application programming interface for a programmable graphics processor comprising a function call to configure a multithreaded processing unit within the programmable graphics processor to disable processing of samples independent of an order in which the samples are received.

Various embodiments of a method of the invention include processing a first program instruction associated with a first thread and a second program instruction associated with a second thread. A first sample to be processed by a program instruction associated with a first thread is received before a second sample to be processed by a program instruction associated with a second thread is received. First source data required to process the program instruction associated with the first thread are determined to be not available. Second source data required to process the program instruction associated with the second thread are determined to be available. The program instruction associated with the second thread to process the second sample in the execution unit is dispatched prior to dispatching the program instruction associated with the first thread to process the first sample in the execution unit.

Further embodiments of a method of the invention include using a function call to configure the graphics processor. Support for processing samples of at least one sample type independent of an order in which the samples are received by a multithreaded processing unit within the graphics processor is detected. The function call to configure the multithreaded processing unit within the graphics processor to enable processing of the samples independent of an order in which the samples are received is issued for the at least one sample type.

Yet further embodiment so of a method of the invention include rendering a scene using the graphics processor. The multithreaded processing unit within the graphics processor is configured to enable processing of samples independent of an order in which the samples are received. The multithreaded processing unit within the graphics processor process the samples independent of the order in which the samples are received to render at least a portion of the scene.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

Figure 1:
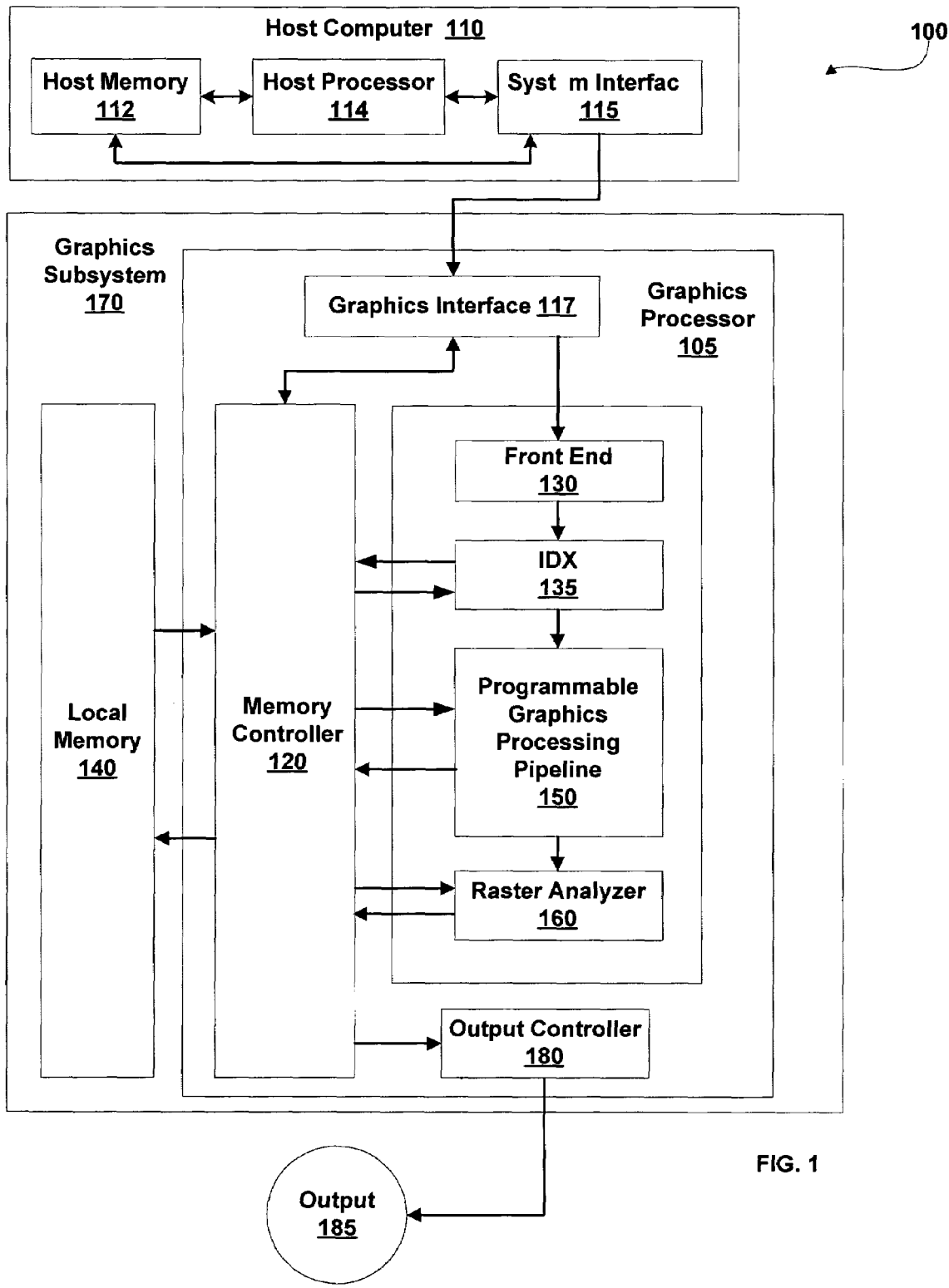
FIG. 1 illustrates one embodiment of a computing system according to the invention including a host computer and a graphics subsystem.
Figure 7A:
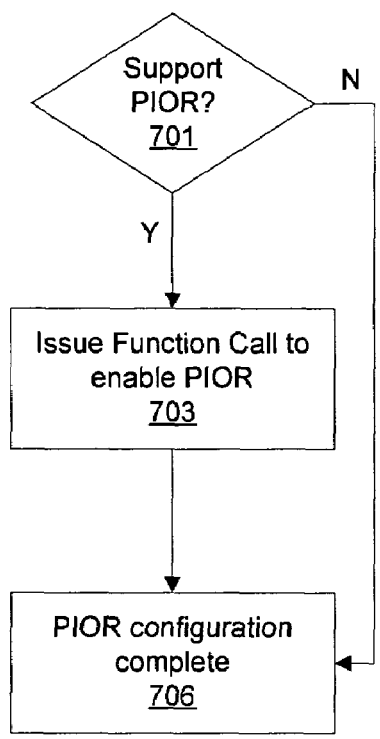
Figure 7B:
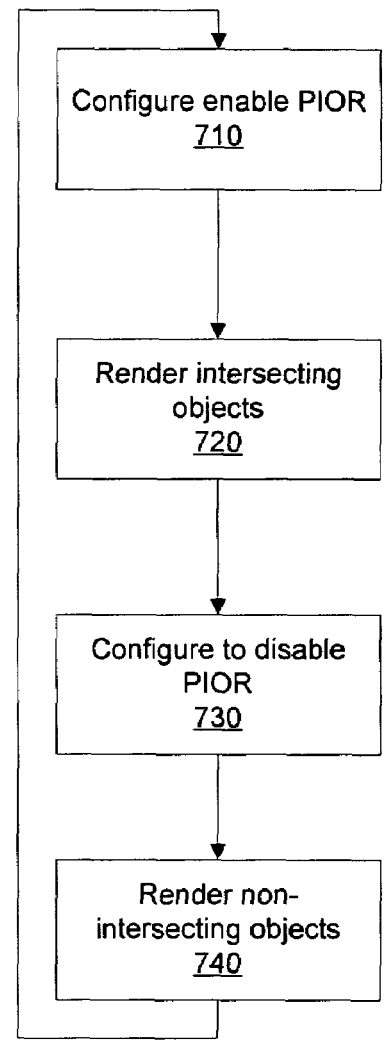
Figure 7C:
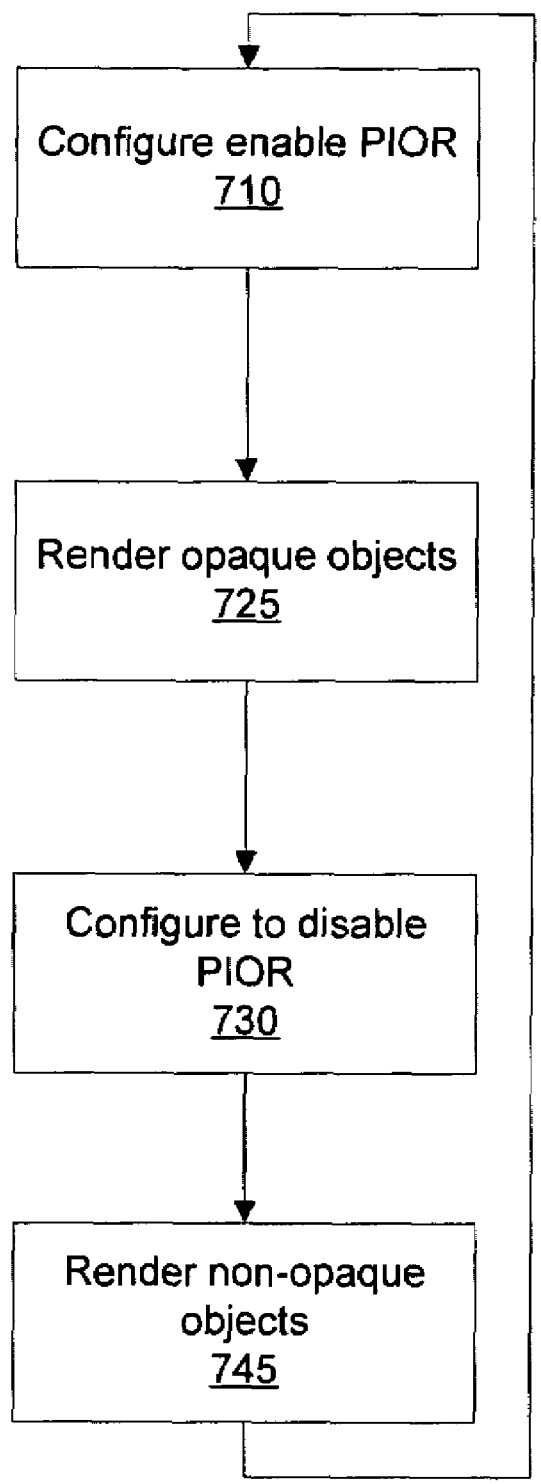

FIGS. 7A, 7B, and 7C illustrate embodiments of methods utilizing the Computing System illustrated in FIG. 1.

DISCLOSURE OF THE INVENTION

The current invention involves new systems and methods for processing graphics data elements in an order independent from the order in which the graphics data elements are received by a multithreaded processing unit within a graphics processor.

FIG. 1 is an illustration of a Computing System generally designated 100 and including a Host Computer 10 and a Graphics Subsystem 170. Computing System 100 may be a desktop computer, server, laptop computer, palm-sized computer, tablet computer, game console, cellular telephone, computer based simulator, or the like. Host Computer 110 includes Host Processor 114 which may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel®Northbridge and Intelg® Southbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory can include portions of Host Memory 112, Local Memory 140, register files coupled to the components within Graphics Processor 105, and the like.

Graphics Processor 105 includes, among other components, Front End 130 that receives commands from Host Computer 110 via Graphics Interface 117. Front End 130 interprets and formats the commands and outputs the formatted commands and data to an IDX (Index Processor) 135. Some of the formatted commands are used by Programmable Graphics Processing Pipeline 150 to initiate processing of data by providing the location of program instructions or graphics data stored in memory. IDX 135, Programmable Graphics Processing Pipeline 150 and a Raster Analyzer 160 each include an interface to Memory Controller 120 through which program instructions and data can be read from memory, e.g., any combination of Local Memory 140 and Host Memory 112. When a portion of Host Memory 112 is used to store program instructions and data, the portion of Host Memory 112 can be uncached so as to increase performance of access by Graphics Processor 105.

IDX 135 optionally reads processed data, e.g., data written by Raster Analyzer 160, from memory and outputs the data, processed data and formatted commands to Programmable Graphics Processing Pipeline 150. Programmable Graphics Processing Pipeline 150 and Raster Analyzer 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 150 and Raster Analyzer 160 are each optionally configured such that data processing operations are performed in multiple passes through those units or in multiple passes within Programmable Graphics Processing Pipeline 150. Programmable Graphics Processing Pipeline 150 and a Raster Analyzer 160 also each include a write interface to Memory Controller 120 through which data can be written to memory.

In a typical implementation Programmable Graphics Processing Pipeline 150 performs geometry computations, rasterization, and pixel computations. Therefore Programmable Graphics Processing Pipeline 150 is programmed to operate on surface, primitive, vertex, fragment, pixel, sample or any other data. A fragment is at least a portion of a pixel, i.e., a pixel includes at least one fragment. For simplicity, the remainder of this description will use the term "samples" to refer to surfaces, primitives, vertices, pixels, or fragments.

Samples output by Programmable Graphics Processing Pipeline 150 are passed to a Raster Analyzer 160, which optionally performs near and far plane clipping and raster operations, such as stencil, z test, and the like, and saves the results or the samples output by Programmable Graphics Processing Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other Computing System 100, other Graphics Subsystem 170, or the like.

Figure 2:
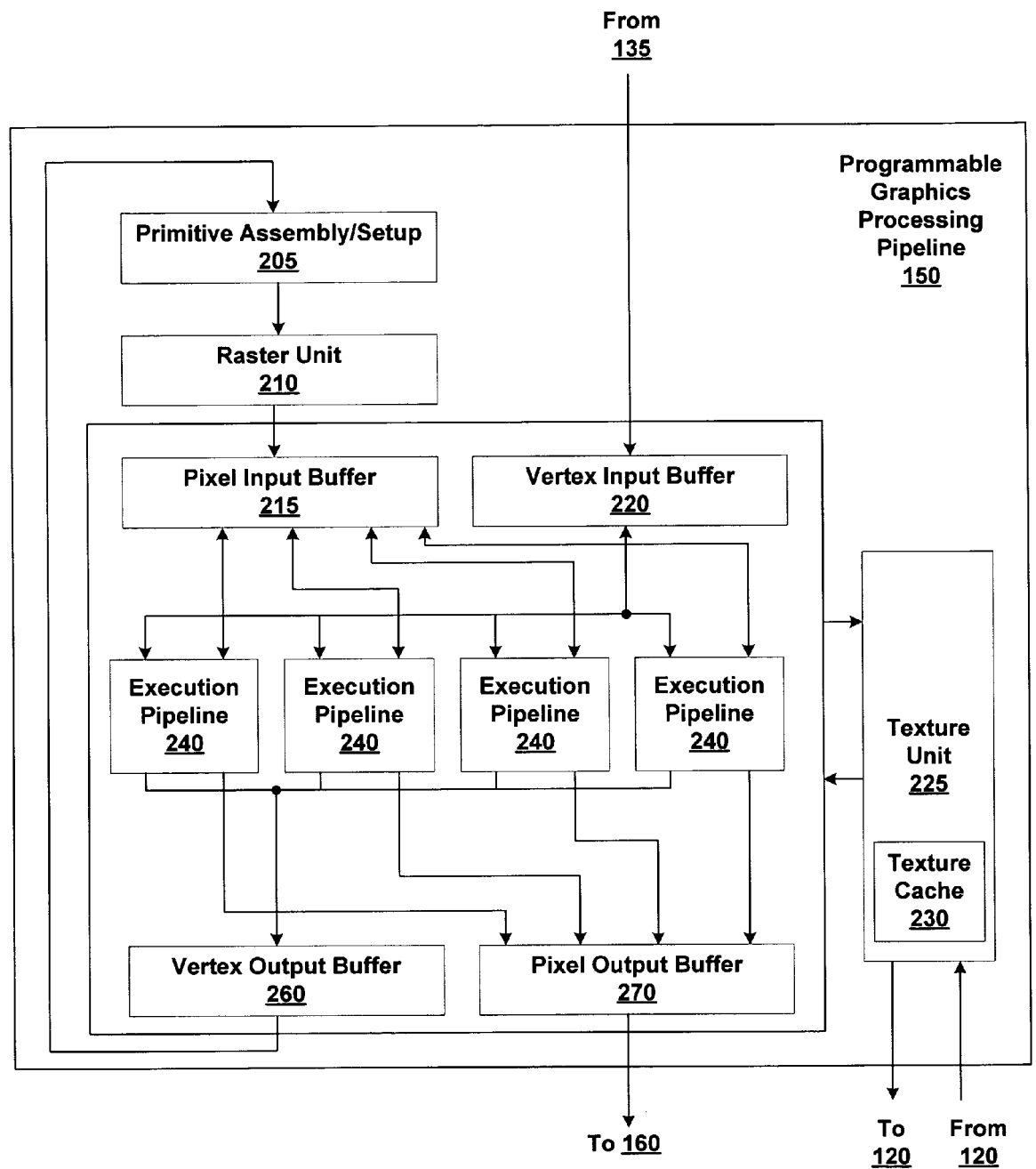
FIG. 2 is a block diagram of an embodiment of the Programmable Graphics Processing Pipeline of FIG. 1.

FIG. 2 is an illustration of Programmable Graphics Processing Pipeline 150 of FIG. 1. At least one set of samples is output by IDX 135 and received by Programmable Graphics Processing Pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by Programmable Graphics Processing Pipeline 150 and stored in a Vertex Input Buffer 220 in a register file, FIFO (first in first out), cache, or the like (not shown). The samples are broadcast to Execution Pipelines 240, four of which are shown in the figure. Each Execution Pipeline 240 includes at least one multithreaded processing unit, to be described further herein. The samples output by Vertex Input Buffer 220 can be processed by any one of the Execution Pipelines 240. A sample is accepted by a Execution Pipeline 240 when a processing thread within the Execution Pipeline 240 is available as described further herein. Each Execution Pipeline 240 signals to Vertex Input Buffer 220 when a sample can be accepted or when a sample cannot be accepted. In one embodiment Programmable Graphics Processing Pipeline 150 includes a single Execution Pipeline 240 containing one multithreaded processing unit. In an alternative embodiment, Programmable Graphics Processing Pipeline 150 includes a plurality of Execution Pipelines 240.

Execution Pipelines 240 can receive first samples, such as higher-order surface data, and tessellate the first samples to generate second samples, such as vertices. Execution Pipelines 240 can be configured to transform the second samples from an object-based coordinate representation (object space) to an alternatively based coordinate system such as world space or normalized device coordinates (NDC) space. Each Execution Pipeline 240 communicates with Texture Unit 225 using a read interface (not shown in FIG. 2) to read program instructions and graphics data such as texture maps from Local Memory 140 or Host Memory 112 via Memory Controller 120 and a Texture Cache 230. Texture Cache 230 is used to improve memory read performance by reducing read latency. In an alternate embodiment Texture Cache 230 is omitted. In another alternate embodiment, a Texture Unit 225 is included in each Execution Pipeline 240. In yet another alternate embodiment program instructions are stored within Programmable Graphics Processing Pipeline 150.

Execution Pipelines 240 output processed samples, such as vertices, that are stored in a Vertex Output Buffer 260 in a register file, FIFO, cache, or the like (not shown). Processed vertices output by Vertex Output Buffer 260 are received by a Primitive Assembly/Setup 205. This unit calculates parameters, such as deltas and slopes, to rasterize the processed vertices. Primitive Assembly/Setup 205 outputs parameters and samples, such as vertices, to Raster Unit 210. The Raster Unit 210 performs scan conversion on samples, such as vertices, and outputs samples, such as fragments, to a Pixel Input Buffer 215. Alternatively, Raster Unit 210 resamples processed vertices and outputs additional vertices to Pixel Input Buffer 215.

Pixel Input Buffer 215 outputs the samples to each Execution Pipeline 240. Samples, such as pixels and fragments, output by Pixel Input Buffer 215 are each processed by only one of the Execution Pipelines 240. Pixel Input Buffer 215 determines which one of the Execution Pipelines 240 to output each sample to depending on an output pixel position, e.g., (x,y), associated with each sample. In this manner, each sample is output to the Execution Pipeline 240 designated to process samples associated with the output pixel position. In an alternate embodiment, each sample output by Pixel Input Buffer 215 is processed by an available Execution Pipeline 240.

A sample is accepted by a Execution Pipeline 240 when a processing thread within the Execution Pipeline 240 is available as described further herein. Each Execution Pipeline 240 signals to Pixel Input Buffer 240 when a sample can be accepted or when a sample cannot be accepted. Program instructions associated with a thread configure programmable computation units within a Execution Pipeline 240 to perform operations such as texture mapping, shading, blending, and the like. Processed samples are output from each Execution Pipeline 240 to a Pixel Output Buffer 270. Pixel Output Buffer 270 optionally stores the processed samples in a register file, FIFO, cache, or the like (not shown). The processed samples are output from Pixel Output Buffer 270 to Raster Analyzer 160.

Execution Pipelines 240 are optionally configured using program instructions read by Texture Unit 225 such that data processing operations are performed in multiple passes through at least one multithreaded processing unit, to be described further herein, within Execution Pipelines 240. Intermediate data generated during multiple passes can be stored in graphics memory.

Figure 3:
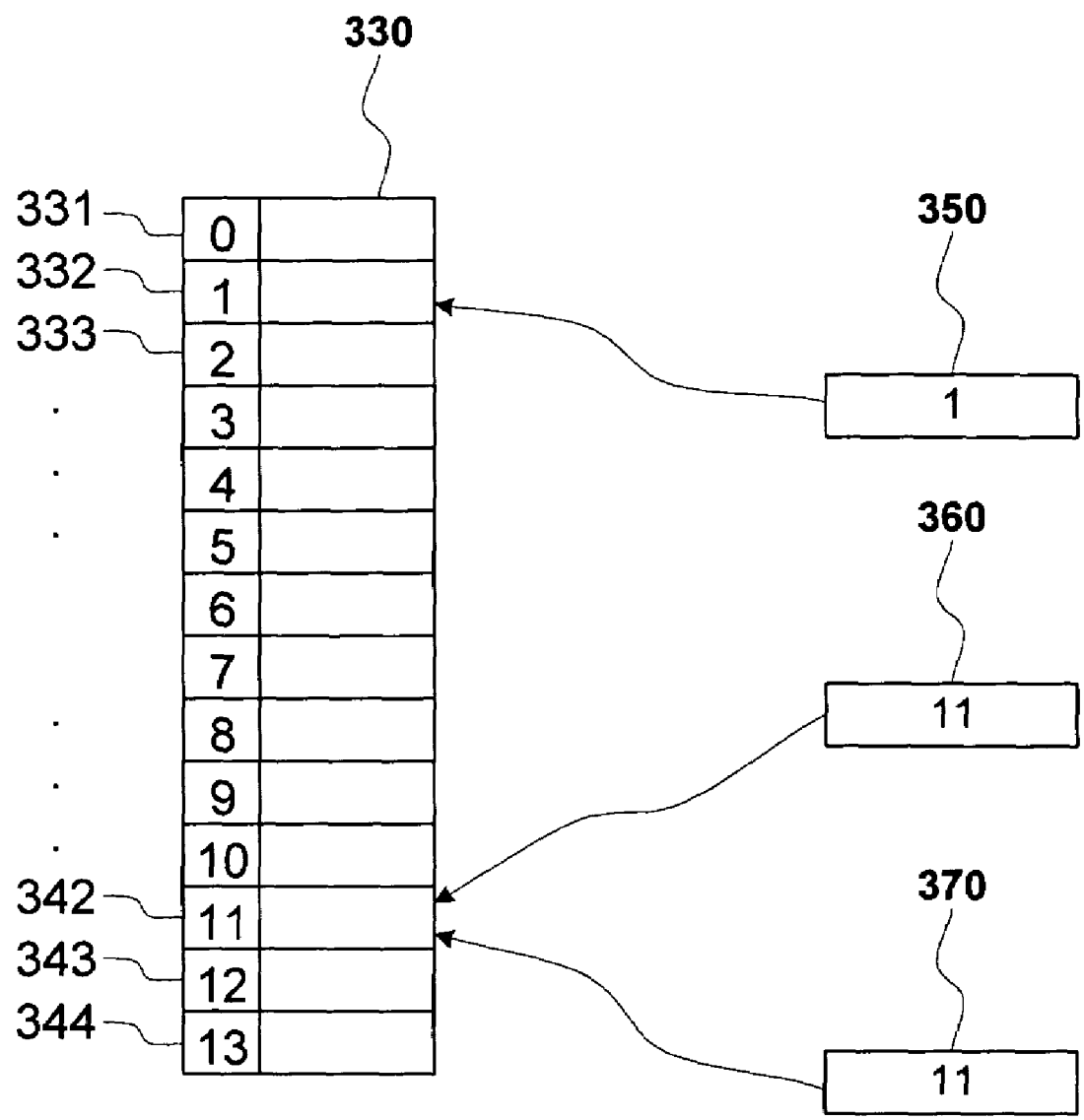
FIG. 3 is a conceptual diagram of the relationship between a program and threads.

FIG. 3 is a conceptual diagram illustrating the relationship between a program and threads. A single program is used to process several sets of samples. Each program, such as a vertex program or shader program, includes a sequence of program instructions such as, a Sequence 330 of program instructions 331 to 344. The at least one multithreaded processing unit within a Execution Pipeline 240 supports multithreaded execution. Therefore the program instructions in instruction Sequence 330 can be used by the at least one multithreaded processing unit to process each sample or each group of samples independently, i.e., the at least one multithreaded processing unit may process each sample asynchronously relative to other samples. For example, each fragment or group of fragments within a primitive can be processed independently from the other fragments or from the other groups of fragments within the primitive. Likewise, each vertex within a surface can be processed independently from the other vertices within the surface. For a set of samples being processed using the same program, the sequence of program instructions associated with each thread used to process each sample within the set will be identical. However, it is possible that, during execution, the threads processing some of the samples within a set will diverge following the execution of a conditional branch instruction. After the execution of a conditional branch instruction, the sequence of executed instructions associated with each thread processing samples within the set may differ.

In FIG. 3 program instructions within instruction Sequence 330 are stored in graphics memory, i.e., Host Memory 112, Local Memory 140, register files coupled to the components within Graphics Processor 105, and the like. Each program counter (0 through 13) in instruction Sequence 330 corresponds to a program instruction within instruction Sequence 330. The program counters are conventionally numbered sequentially and can be used as an index to locate a specific program instruction within Sequence 330. The first instruction 331 in the sequence 330 represents is the program instruction corresponding to program counter 0. A base address, corresponding to the graphics memory location where the first instruction 331 in a program is stored, can be used in conjunction with a program counter to determine the location where a program instruction corresponding to the program counter is stored.

In this example, program instructions within Sequence 330 are associated with three threads. A Thread 350, a Thread 360 and a Thread 370 are each assigned to a different sample and each thread is uniquely identified by a thread identification code. A program instruction within Sequence 330 is associated with a thread using a program counter that is stored as a portion of thread state data, as described further herein. Thread 350 thread state data includes a program counter of 1 as shown in Sequence 330. The program counter associated with Thread 350 is a pointer to the program instruction in Sequence 330 corresponding to program counter 1 and stored at location 332. The instruction stored at location 332 is the next instruction to be used to process the sample assigned to Thread 350. Alternatively, an instruction stored at location 332 is the most recently executed instruction to process the sample assigned to Thread 350.

The thread state data for Thread 360 and Thread 370 each include a program counter of 11, as shown in FIG. 3, referencing the program instruction corresponding to program counter 11 in Program 330 and stored at location 342. Program counters associated with threads to process samples within a primitive, surface, or the like, are not necessarily identical because the threads can be executed independently. When branch instructions are not used, Thread 350, Thread 360 and Thread 370 each execute all of the program instructions in Sequence 330.

The number of threads that can be executed simultaneously is limited to a predetermined number in each embodiment and is related to the number of Execution Pipelines 240, the amount of storage required for thread state data, the latency of Execution Pipelines 240, and the like. Each sample is a specific type, e.g., primitive, vertex, or pixel, corresponding to a program type. A primitive type sample, e.g., primitive, is processed by a primitive program, a vertex type sample, e.g., surface or vertex, is processed by a vertex program, and a pixel type sample, e.g., fragment or pixel, is processed by a shader program. Likewise, a primitive thread is associated with program instructions within a primitive program, a vertex thread is associated with program instructions within a vertex program, and a pixel thread is associated with program instructions within a shader program.

A number of threads of each thread type that may be executed simultaneously is predetermined in each embodiment. Therefore, not all samples within a set of samples of a type can be processed simultaneously when the number of threads of the type is less than the number of samples. Conversely, when the number of threads of a type exceeds the number of samples of the type within a set, more than one set can be processed simultaneously. Furthermore, when the number of threads of a type exceeds the number of samples of the type within one or more sets, more than one program of the type can be executed on the one or more sets and the thread state data can include data indicating the program associated with each thread.

Figure 4:
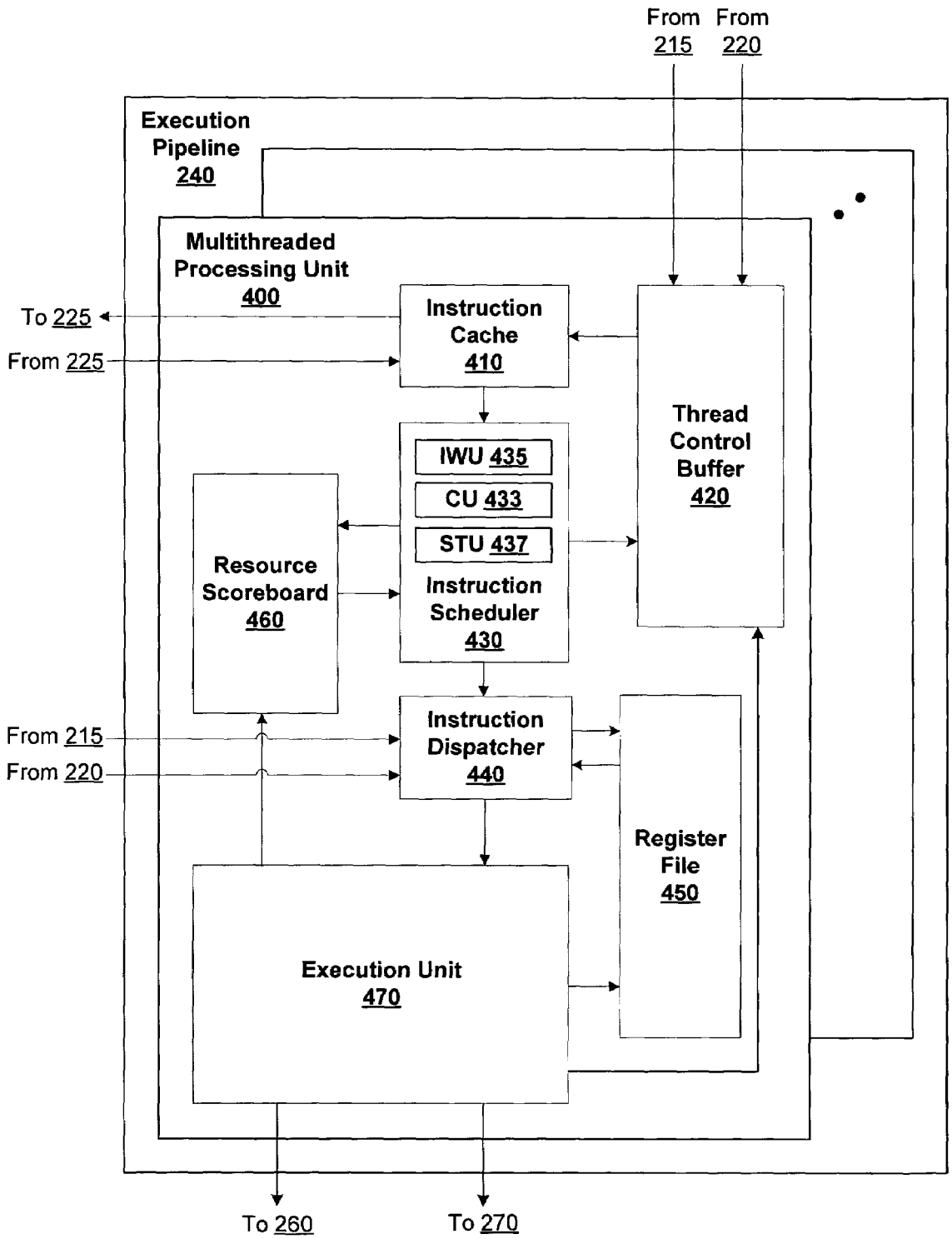
FIG. 4 is a block diagram of an embodiment of the Execution Pipeline of FIG. 2.

FIG. 4 is an illustration of a Execution Pipeline 240 containing at least one Multithreaded Processing Unit 400. A Execution Pipeline 240 can contain a plurality of Multithreaded Processing Units 400. Within each Multithreaded Processing Unit 400, a Thread Control Buffer 420 receives samples from Pixel Input Buffer 215 or Vertex Input Buffer 220. Thread Control Buffer 420 includes storage resources to retain thread state data for a subset of the predetermined number of threads. In one embodiment Thread Control Buffer 420 includes storage resources for each of at least two thread types, where the at least two thread types can include pixel, primitive, and vertex. At least a portion of Thread Control Buffer 420 is a register file, FIFO, circular buffer, or the like. Thread state data for a thread can include, among other things, a program counter, a busy flag that indicates if the thread is either assigned to a sample or available to be assigned to a sample, a pointer to the source sample to be processed by the instructions associated with the thread or the output pixel position and output buffer ID of the sample to be processed, and a pointer specifying a destination location in Vertex Output Buffer 260 or Pixel Output Buffer 270. Additionally, thread state data for a thread assigned to a sample can include the sample type, e.g., pixel, vertex, primitive, or the like.

The source sample is stored in either Pixel Input Buffer 215 or Vertex Input Buffer 220. When a thread is assigned to a sample, the thread is allocated storage resources to retain intermediate data generated during execution of program instructions associated with the thread. The thread identification code for a thread may be the address of a location in Thread Control Buffer 420 in which the thread state data for the thread is stored. In one embodiment, priority is specified for each thread type and Thread Control Buffer 420 is configured to assign threads to samples or allocate storage resources based on the priority assigned to each thread type. In an alternate embodiment, Thread Control Buffer 420 is configured to assign threads to samples or allocate storage resources based on an amount of sample data in Pixel Input Buffer 215 and another amount of sample data in Vertex Input Buffer 220.

An Instruction Cache 410 reads one or more thread entries, each containing thread state data, from Thread Control Buffer 420. Instruction Cache 410 may read thread entries to process a group of samples. For example, in one embodiment a group of samples, e.g., a number of vertices defining a primitive, four adjacent fragments arranged in a square, or the like, are processed simultaneously. In the one embodiment computed values such as derivatives are shared within the group of samples thereby reducing the number of computations needed to process the group of samples compared with processing the group of samples without sharing the computed values.

In an embodiment of Multithreaded Processing Unit 400, priority is specified for each thread type and Instruction Cache 410 is configured to read thread entries based on the priority assigned to each thread type. In another embodiment, Instruction Cache 410 is configured to read thread entries based on the amount of sample data in Pixel Input Buffer 215 and the amount of sample data in Vertex Input Buffer 220. Instruction Cache 410 determines if the program instructions corresponding to the program counters and sample type included in the thread state data for each thread entry are available in Instruction Cache 410. When a requested program instruction is not available in Instruction Cache 410 it is read (possibly along with other program instructions stored in adjacent memory locations) from graphics memory. In an alternate embodiment Instruction Cache 410 can be shared between Multithreaded Processing Units 400 within Execution Pipeline 240.

The program instructions corresponding to the program counters from the one or more thread entries are output by Instruction Cache 410 to a scheduler, Instruction Scheduler 430. A cache miss in Instruction Cache 410 can result in instructions being output by Instruction Cache 410 in an order which is different than the order in which the samples to be processed by the instructions were received by Thread Control Buffer 420. For example when an instruction to process a first received sample is not stored in Instruction Cache 410 and an instruction to process a second received sample is stored in Instruction Cache 410, the instruction to process the second received sample will be output by Instruction Cache 410 to Instruction Scheduler 430 while the instruction to process the first received sample is read from graphics memory.

The number of instructions output each clock cycle from Instruction Cache 410 to Instruction Scheduler 430 can vary depending on whether or not the instructions are available in the cache. The number of instructions that can be output each clock cycle from Instruction Cache 410 to Instruction Scheduler 430 may also vary between different embodiments. In one embodiment, Instruction Cache 410 outputs one instruction per clock cycle to Instruction Scheduler 430. In an alternate embodiment, Instruction Cache 410 outputs a predetermined number of instructions per clock cycle to Instruction Scheduler 430.

Instruction Scheduler 430 contains storage resources to store a predetermined number of instructions in an IWU (instruction window unit) 435. Each clock cycle, Instruction Scheduler 430 evaluates whether any instruction within the IWU 435 can be executed based on the availability of computation resources in an Execution Unit 470 and source data stored in a Register File 450. An instruction specifies the location of source data needed to execute the instruction. In addition to Register File 450, other locations of source data include Pixel Input Buffer 215, Vertex Input Buffer 220, locations in Local Memory 140, locations in Host Memory 112, and the like. A resource tracking unit, Resource Scoreboard 460, tracks the status of source data stored in registers in Register File 450. Specifically, registers scheduled to be written during processing, i.e., destination registers, are marked as "write pending". When a destination register is written, its status is updated and the "write pending" mark is removed. In one embodiment a destination register is marked as "write pending" by setting a bit in Resource Scoreboard 460 corresponding to the destination register. The bit is cleared when the destination register is written, indicating that data stored in the register is available to be used as source data. Similarly, Resource Scoreboard 460 may also track the availability of the computation resources in an Execution Unit 470.

During the evaluation process, in one embodiment Instruction Scheduler 430 is configured to give priority to threads based on thread age (lowest program counter or greatest number of clock cycles resident in IWU 435). A CU (Comparison Unit) 433 is used to compare program counters. In an alternate embodiment, in addition to program counters, thread state data such as stack depths, nesting levels, subroutine calls, or the like are used to determine thread age. An STU (Scheduling Timeout Unit) 437 is used to count the number of consecutive clock cycles each instruction in IWU 435 is resident in IWU 435. In one embodiment, priority is specified for each thread type and Instruction Cache 410 is configured to read thread entries based on the priority assigned to each thread type. In another embodiment, Instruction Cache 410 is configured to read thread entries based on the amount of sample data in Pixel Input Buffer 215 and the amount of sample data in Vertex Input Buffer 220.

When Instruction Scheduler 430 determines which instructions and associated threads will be executed, Instruction Scheduler 430 outputs at least one instruction to a dispatcher, Instruction Dispatcher 440, updates destination register status and computation resource availability in Resource Scoreboard 460 and increments each program counter associated with the threads in Thread Control Buffer 420 associated with the at least one instruction output. In this manner, Instruction Scheduler 430 is able to schedule the execution of the instructions associated with each thread such that the processing of a sample is one or more instructions ahead of the processing of another sample. As a result of Instruction Scheduler 430 not being constrained to schedule instructions for execution on each sample within a set of data synchronously, the samples are not necessarily processed or output in the order in which they were received.

Instruction Dispatcher 440 gathers the source data specified in an instruction and outputs the instruction and source data to Execution Unit 470. Execution Unit 470 is configured by the program instruction to process samples using programmable computation units to perform operations such as linear interpolation, derivative calculation, blending, and the like, and output the processed sample to a destination specified by the instruction. The destination can be Vertex Output Buffer 260, Pixel Output Buffer 270, or Register File 450. When execution of an instruction is complete, Execution Unit 470 updates Resource Scoreboard 460 to indicate that destination registers are written and the computation resources used to process the instruction are available. Likewise, Execution Unit 470 updates each program counter associated with the threads in Thread Control Buffer 420 following the execution of a loop or branch instruction. In an alternate embodiment, Resource Scoreboard 460 snoops an interface between Execution Unit 470 and Register File 450 to update register status.

When the program instructions associated with a thread have completed execution, the storage resources allocated to retain intermediate data generated during execution of the thread become available for allocation to another thread, i.e., the storage resources are deallocated and the thread is flagged as available in Thread Control Buffer 420. When a program instruction stored in Instruction Cache 410 has completed execution on each sample within the one or more sets that the program instruction is programmed to process, the program instruction is retired from Instruction Cache 410 (by being overwritten).

The occurrence of image artifacts caused by failing to maintain sample processing order for each output pixel position between frames or within a frame can be significantly reduced or eliminated by processing pixel type samples, e.g., pixels, fragments, and the like, for each output pixel location, in the order in which the pixel type samples are received. Processing the pixel type samples for each output pixel location in the order in which the pixel type samples are received can be achieved by permitting pixel type samples corresponding to each output pixel location to be processed by a dedicated Multithreaded Processing Unit 400 and by preventing the occurrence of position hazards. A position hazard exists when more than one pixel type sample corresponding to an output pixel position within an output buffer is being processed by any Multithreaded Processing Unit 400 because the order in which samples will be processed is not deterministic, i.e., is not necessarily the same as the order in which the samples are received. In one embodiment each Multithreaded Processing Unit 400 is configured to process several output pixel locations distributed across an output image. In an alternate embodiment each Multithreaded Processing Unit 400 is configured to process several adjacent output pixel locations within the output image. In another embodiment each Multithreaded Processing Unit 400 is configured to process regions of four adjacent pixels arranged in a square, with each square distributed within the output image.

Thread Control Buffer 420 can be configured to accept only one fragment or pixel from Pixel Input Buffer 215 corresponding to each output pixel position within an output buffer and wait until the one fragment or pixel is processed before accepting another fragment or pixel corresponding to the same output pixel position within the output buffer. The output pixel position is stored as a portion of portion of thread state data in Thread Control Buffer 420. An output buffer ID specifying a unique output buffer containing output pixel positions is also optionally stored as a portion of thread state data in Thread Control Buffer 420. A process independent of order received (PIOR) flag is used to disable the prevention of position hazards. Disabling the PIOR flag during rendering eliminates image artifacts that can be introduced when fragment or pixel processing order for each output pixel location within an output buffer is not maintained between frames or within a frame. Enabling the PIOR flag during rendering can improve performance. Furthermore, a PIOR flag may be dedicated for each thread type to selectively enable or disable PIOR for each thread type.

In an alternate embodiment each Multithreaded Processing Unit 400 is configured to process fragments and pixels corresponding to any output pixel position and Pixel Input Buffer 215 can be configured to output only one fragment or pixel corresponding to each output pixel position within an output buffer. In the alternate embodiment Pixel Input Buffer 215 waits until the one fragment or pixel corresponding to an output pixel position within an output buffer is processed before outputting another fragment or pixel corresponding to the same output pixel position within the output buffer.

Figure 5A:
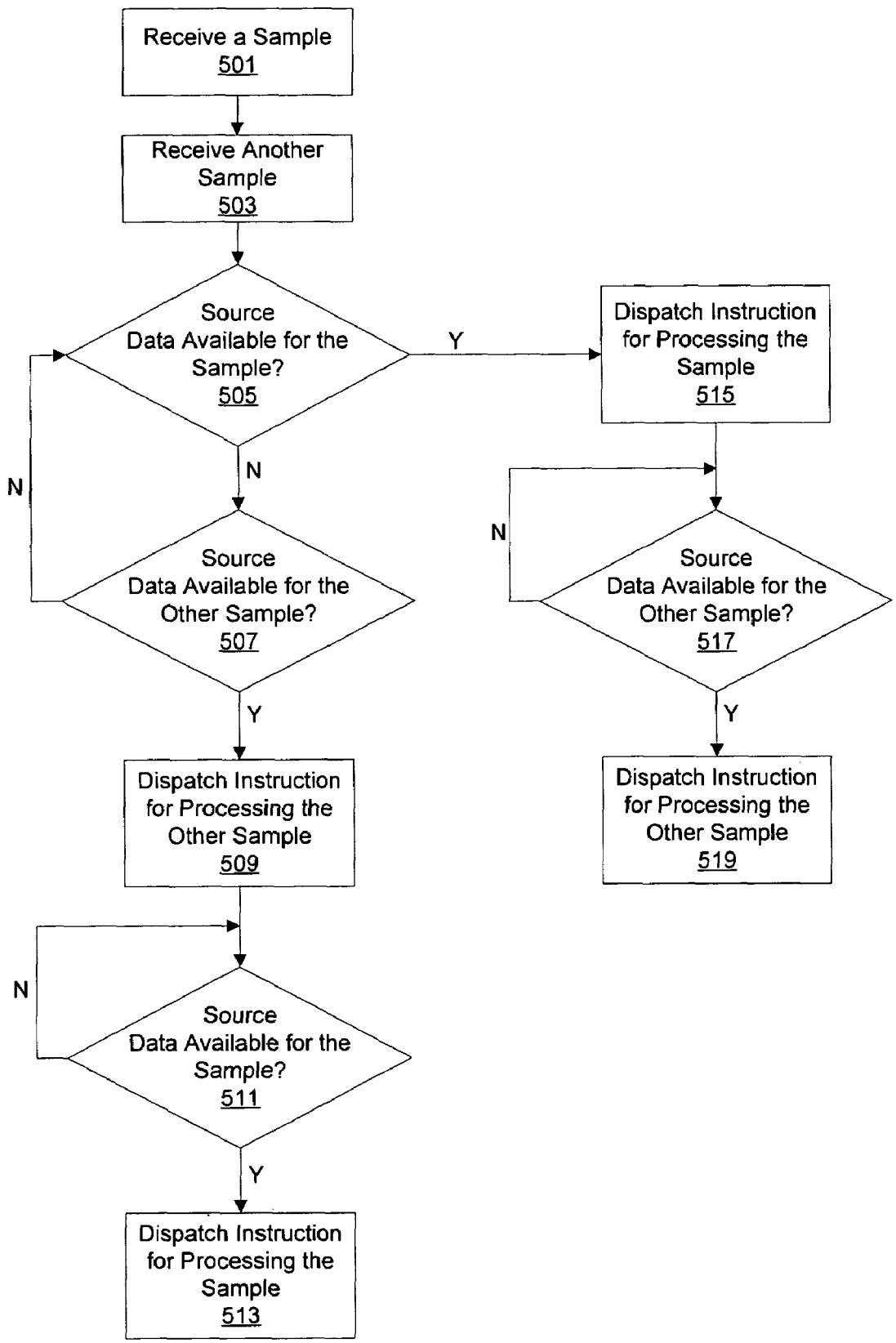
FIGS. 5A and 5B illustrate embodiments of methods utilizing the Execution Pipeline illustrated in FIG. 4.

FIG. 5A illustrates an embodiment of a method utilizing Multithreaded Processing Unit 400 to dispatch program instructions to process two samples. In step 501, Thread Control Buffer 420 receives a sample to be processed by a program instruction associated with a thread from Vertex Input Buffer 220 or Pixel Input Buffer 215. In step 503, Thread Control Buffer 420 receives another sample to be processed by a program instruction associated with another thread from Vertex Input Buffer 220 or Pixel Input Buffer 215, after receiving the sample. In step 505, Instruction Scheduler 430 determines if source data required to process the program instruction associated with the thread are available, and, if so, in step 515 Instruction Scheduler 430 outputs the program instruction associated with the thread to Instruction Dispatcher 440. In step 515 Instruction Dispatcher 440 also dispatches the program instruction associated with the thread and updates the register status for destination registers. In an alternate embodiment, in step 505 Instruction Scheduler also determines if a computation resource within Execution Unit 470 required to process the program instruction associated with the thread is available.

In step 517 Instruction Scheduler 430 determines if source data required to process the program instruction associated with the other thread are available, and, if so, in step 519 Instruction Scheduler 430 outputs the program instruction associated with the other thread to Instruction Dispatcher 440. In step 519 Instruction Dispatcher 440 also dispatches the program instruction associated with the other thread and updates the register status for destination registers. If in step 517 Instruction Scheduler 430 determines source data required to process the program instruction associated with the other thread are not available, Instruction Scheduler 430 remains in step 517. In an alternate embodiment, in step 517 Instruction Scheduler also determines if a computation resource within Execution Unit 470 required to process the program instruction associated with the other thread is available.

If in step 505 Instruction Scheduler 430 determines source data required to process the program instruction associated with the thread are not available, in step 507 Instruction Scheduler 430 determines if source data required to process the program instruction associated with the other thread are available. If in step 507 Instruction Scheduler 430 determines source data required to process the program instruction associated with the other thread are not available, Instruction Scheduler 430 returns to step 505. If in step 507 Instruction Scheduler 430 determines source data required to process the program instruction associated with the other thread are available, in step 509 Instruction Scheduler 430 outputs the program instruction associated with the other thread to Instruction Dispatcher 440 prior to outputting the program instruction associated with the thread. In step 509 Instruction Dispatcher 440 also dispatches the program instruction associated with the other thread and updates the register status for destination registers.

In step 511, Instruction Scheduler 430 determines if source data required to process the program instruction associated with the thread is available, and, if so, in step 513 Instruction Scheduler 430 outputs the program instruction associated with the thread to Instruction Dispatcher 440. In step 513 Instruction Dispatcher 440 also dispatches the program instruction associated with the thread and updates the register status for destination registers. If in step 511 Instruction Scheduler 430 determines source data required to process the program instruction associated with the thread are not available, Instruction Scheduler 430 remains in step 511.

In an alternate embodiment, in step 507 Instruction Scheduler also determines if a computation resource within Execution Unit 470 required to process the program instruction associated with the other thread is available and in step 511 Instruction Scheduler also determines if a computation resource within Execution Unit 470 required to process the program instruction associated with the thread is available.

Figure 5B:
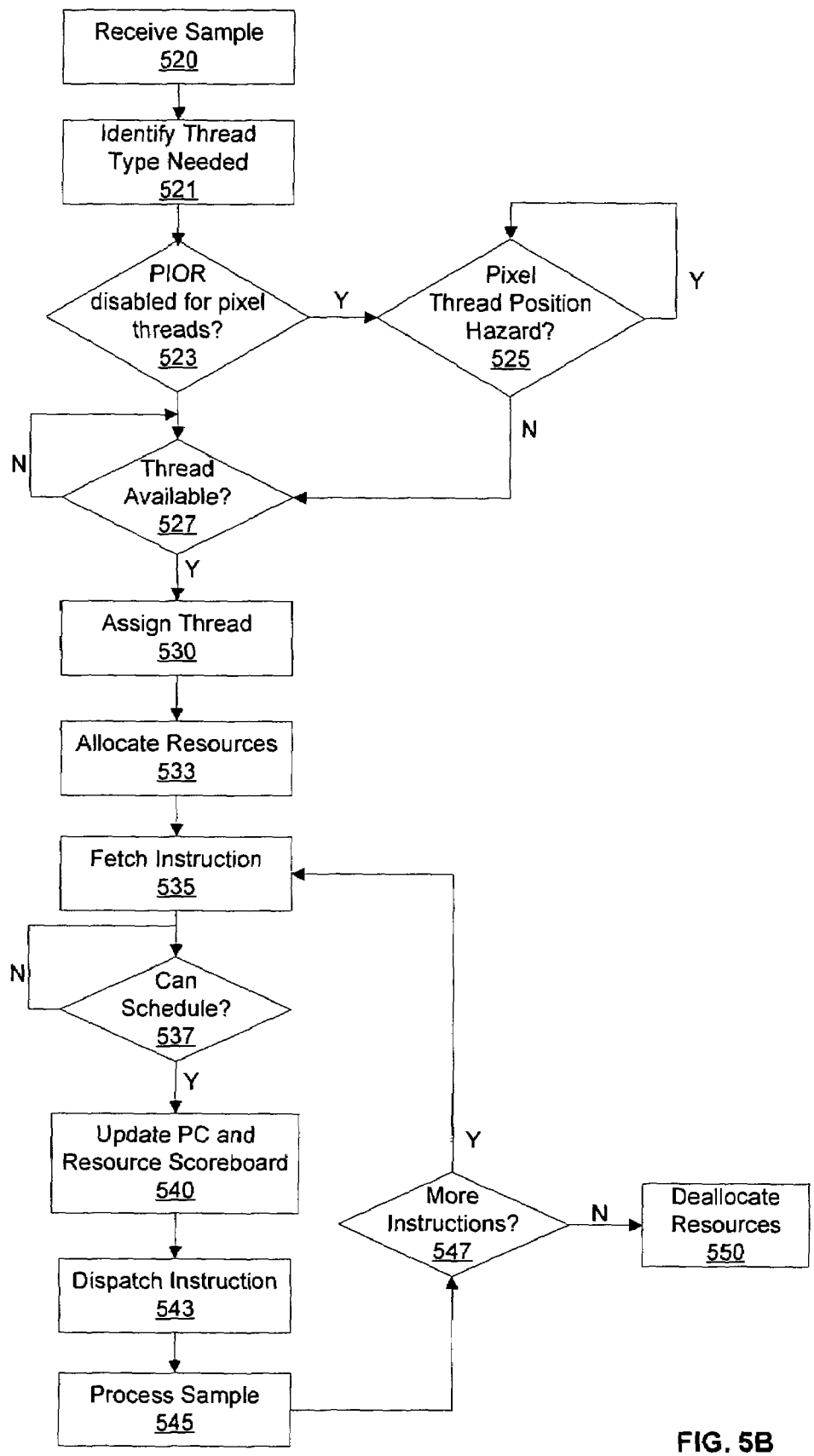

FIG. 5B illustrates an embodiment of a method utilizing Multithreaded Processing Unit 400 to process one sample. In step 520, Thread Control Buffer 420 receives the sample from Vertex Input Buffer 220 or Pixel Input Buffer 215. In step 521, Thread Control Buffer 420 determines a thread type needed to process the sample. In step 523 Thread Control Buffer 420 determines if the PIOR flag is disabled for pixel threads (used to process pixels or fragments), and, if so, in step 525 Thread Control Buffer 420 determines if a position hazard exists for the sample. If in step 525 Thread Control Buffer 420 determines a position hazard exists for the sample, Thread Control Buffer 420 remains in step 525. A position hazard exists when an output pixel position associated with a sample is equal to an output pixel position associated with another sample and an output buffer ID associated with the sample is equal to an output buffer ID associated with the other sample.

If in step 525 Thread Control Buffer 420 determines a position hazard does not exist for the sample, Thread Control Buffer 420 stores at least a portion of the output pixel position of the sample as state information. In step 527, Thread Control Buffer 420 determines if a thread is available to process the sample in Multithreaded Processing Unit 400, and, if so, in step 530 Thread Control Buffer 420 assigns a thread to the sample. When a thread is not available in step 527, Thread Control Buffer 420 does not proceed to step 530 until a thread becomes available. In step 530 the busy flag portion of the thread state data is marked unavailable and the program counter corresponding to the first instruction to process the sample is stored in the thread state data. In step 530 Thread Control Buffer 420 also stores the position corresponding to the sample in the thread state data. In step 533 Thread Control Buffer 220 allocates storage resources for storing intermediate data generated during execution of the thread. The storage resources may be in graphics memory.

In step 535 Instruction Cache 410 fetches one or more instructions referenced by the program counter by reading the thread state data for the thread in Thread Control Buffer 420 with a busy flag indicating the thread is assigned to a sample. The one or more instructions can be located in Instruction Cache 410, a local storage resource, Local Memory 140, or Host Memory 112. Instruction Cache 410 outputs the one or more instructions to Instruction Scheduler 430. In step 537, Instruction Scheduler 430 determines if the one or more instructions can be scheduled based on source data availability, and, if not, remains in step 537. If in step 537 Instruction Scheduler 430 determines the one or more instructions can be scheduled based on source data availability, in step 540 Instruction Scheduler 430 updates the program counter stored in Thread Control Buffer 420, updates destination register status and outputs the one or more instructions to Instruction Dispatcher 440. The program counter can be updated by outputting a modified program counter to Thread Control Buffer 420 or by outputting a value, indicating the number of the one or more scheduled instructions, to be added to the program counter. The one or more instructions are output either in parallel or serially to Instruction Dispatcher 440 as specified by Instruction Scheduler 430. Instructions within a program can be scheduled for parallel execution by Instruction Scheduler 430 when the instructions are independent from each other and parallel execution will not modify the function of the program.

In step 543 Instruction Dispatcher 440 gathers the source data specified by each of the one or more instructions and outputs the instruction and the source data to Execution Unit

470. In step 545 Execution Unit 470 executes the one or more instructions associated with the thread to process the sample. Execution Unit 470 writes processed sample data to each destination specified by the one or more instructions and updates destination register status in Resource Scoreboard 460. In step 545 Execution Unit 470 also updates the program counter associated with the thread when a branch or loop instruction is executed and the program counter is different than the program counter updated in step 540. In step 547 Execution Unit determines if there are more instructions in the thread, and, if so, returns to step 535. If Execution Unit 470 determines there are no more instructions in the thread and there are no pending destination register writes associated with the thread, in step 550 the thread busy flag is marked as available in Thread Control Buffer 420 and the storage resources are effectively deallocated.

In an alternate embodiment steps 523 and 525 are completed by Instruction Scheduler 430 instead of being completed by Thread Control Buffer 420. In yet another alternate embodiment steps 523 and 525 are completed by Instruction Dispatcher 440 prior to gathering source data instead of being completed by Thread Control Buffer 420.

Rather than processing one sample as shown in FIG. 5, Multithreaded Processing Unit 400 receives a stream of samples, additional threads are assigned to each sample and instructions are fetched for each thread. Instruction Scheduler 430 determines which instructions can be scheduled, choosing amongst instructions that process different samples. In this manner Multithreaded Processing Unit 400 can simultaneously process one or more samples using at least one program, where each sample may be processed in an order that is independent of the order in which the samples were received by Multithreaded Processing Unit 400. Likewise, each Multithreaded Processing Unit 400 can simultaneously process one or more samples using at least one program, where each sample may be processed in an order that is independent of the order in which the samples were received by Execution Pipeline 240.

Figure 6:
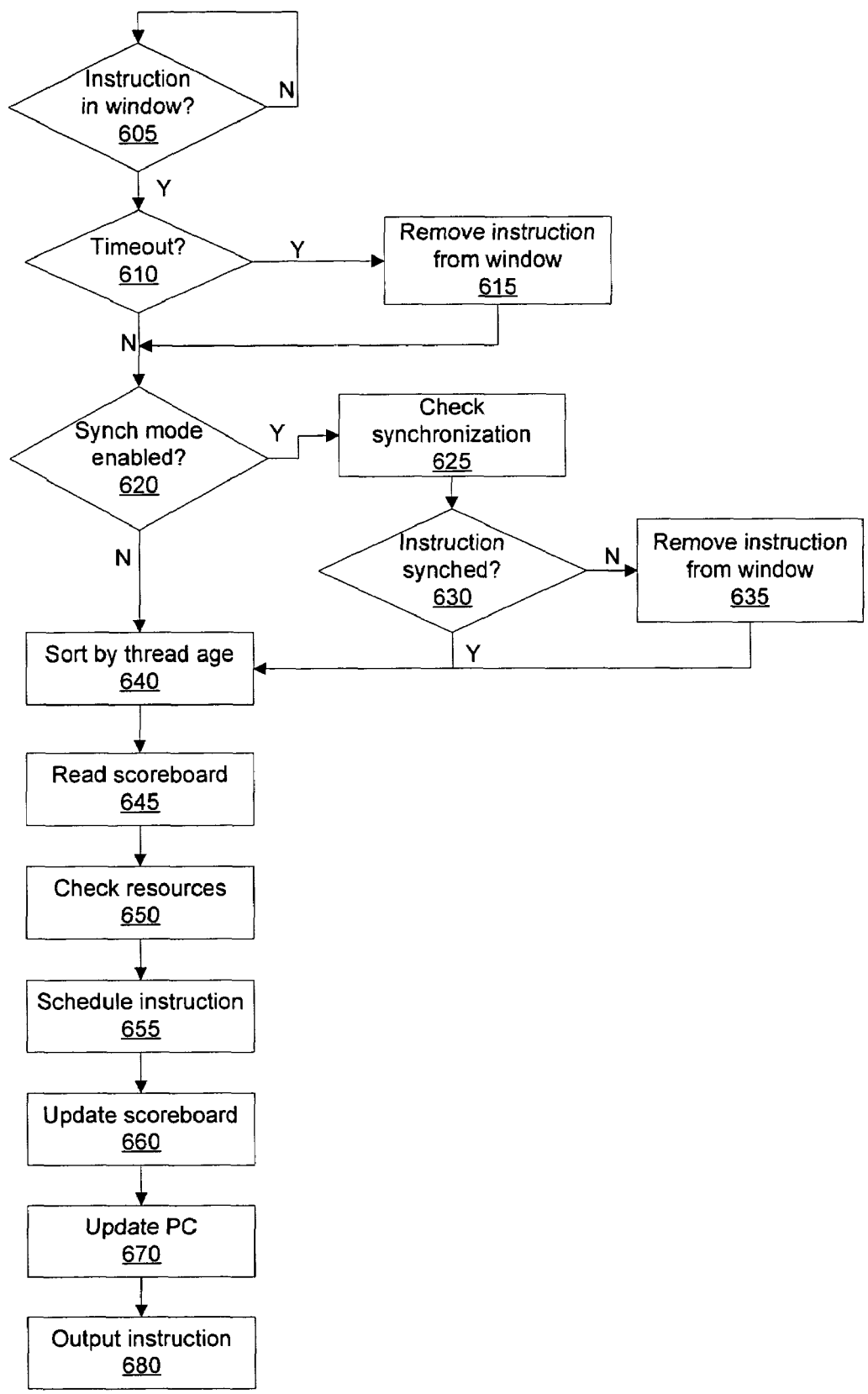
FIG. 6 illustrates an embodiment of a method utilizing the Execution Pipeline illustrated in FIG. 4.

FIG. 6 illustrates an embodiment of a method utilizing Instruction Scheduler 430 to schedule the execution of program instructions to process several samples. In step 605 Instruction Scheduler 430 determines if there is an instruction in IWU 435, and, if not, Instruction Scheduler 430 waits for an instruction. If Instruction Scheduler 430 determines there is at least one instruction in IWU 435, in step 610 Instruction Scheduler 430 uses STU 437 to determine which if any of the instructions in IWU 435 have remained in IWU 435 for a time longer than a predetermined scheduling timeout limit. The scheduling timeout limit can be fixed or programmable. If in step 610 Instruction Scheduler 430 determines at least one of the instructions in IWU 435 has remained in IWU 435 for a time longer than the scheduling timeout limit, in step 615 the at least one instruction is removed from IWU 435. Each location in IWU 435 that stored a removed instruction is available to receive an instruction from Instruction Cache 410. Removing an instruction to process a sample from IWU 435 will delay the processing of the sample and can result in the sample being processed after other samples that were received by Thread Control Buffer 420 after the sample.

If in step 610 Instruction Scheduler 430 determines none of the instructions in IWU 435 has remained in IWU 435 for a time longer than the scheduling timeout limit, in step 620 Instruction Scheduler 430 determines if a synchronization mode is enabled. If in step 620 Instruction Scheduler 430 determines a synchronization mode is enabled, in step 625 Instruction Scheduler 430 checks for synchronization and proceeds to step 630. In one embodiment, instructions with equal program counters are considered synchronized. In another embodiment, in addition to program counters, thread state data such as stack depths, nesting levels, subroutine calls, or the like are used to determine two or more threads are synchronized.

In step 630 Instruction Scheduler 430 determines if any of the instructions are synchronized, and, if not, in step 635 those instructions are removed from IWU 435. If in step 630 Instruction Scheduler 430 determines the instructions in IWU 435 are synchronized Instruction Scheduler 430 proceeds to step 640. In an alternate embodiment, the instruction synchronization can be included in either Thread Control Buffer 420 or Instruction Cache 410 and instructions that are not synchronized are not output from Instruction Cache 410 to Instruction Scheduler 430.

In step 640 Instruction Scheduler 430 sorts the instructions remaining in IWU 435 by thread age, e.g., from oldest to newest. In step 645 Instruction Scheduler 430 reads from Resource Scoreboard 460 to determine source data availability. In step 650 Instruction Scheduler 430 compares the source data availability with the source data requirements of the sorted instructions. In step 655 Instruction Scheduler 430 determines which instructions can be scheduled for execution and in step 660 Instruction Scheduler 430 writes Resource Scoreboard 460 as needed to update destination register status. Unavailability of source data required to process a received sample can result in a later received sample being processed before the received sample.

In step 670 Instruction Scheduler 430 writes to Thread Control Buffer 420 to update the program counter for each thread corresponding to an instruction that was scheduled for execution. In step 680 Instruction Scheduler 430 outputs the scheduled instructions to Instruction Dispatcher 440.

Conventional graphics processing systems have not permitted the scheduling of instructions for execution on each sample within a set of samples in an order independent from the order in which the samples were received because doing so can result in image artifacts. For example, image artifacts can be introduced when fragment or pixel processing order is not maintained for each output pixel location between frames or within a frame. Specifically, intersecting or coincident primitives or surfaces can yield different results for a fragment or pixel where the computed depth values for the intersecting or coincident primitives or surfaces are equal. For example, along a line of intersection between two primitives, a fragment can be "reordered" resulting in an artifact caused when an earlier transmitted fragment is determined to be "behind" a later transmitted fragment due to reordering resulting in the earlier transmitted fragment being processed after the later transmitted sample. As sequential frames of the scene are viewed, the line of intersection can seem to wiggle, sparkle, or crawl. Likewise, when two primitives are coincident and different colors, pixels within sequential frames can change color from frame to frame when fragments are "reordered". Furthermore, the color of each pixel within the two primitives is dependent on processing order such that within a frame the two primitives may appear speckled. It is possible to reduce visual artifacts by enabling and disabling the PIOR for pixel type sample processing during rendering.

FIG. 7A illustrates an embodiment of a method utilizing a function call to configure Programmable Graphics Processing Pipeline 150 to process samples independent of the order in which the samples are received for at least one sample type. In step 701 a device driver executed by Host Processor 114 detects if Programmable Graphics Processing Pipeline 150 supports the PIOR and communicates that information to an application programming interface (API). If the device driver detects the Programmable Graphics Processing Pipeline 150 supports the PIOR, in step 703 a graphics application executed by Host Processor 114 issues the function call to configure Programmable Graphics Processing Pipeline 150 within Graphics Processor 105 to process pixel and fragment samples ignoring position hazards for pixel threads, by enabling the PIOR for pixel type samples. If the device driver detects the Programmable Graphics Processing Pipeline 150 does not support the PIOR, the graphics application proceeds to step 706. In step 706 the PIOR configuration is complete. In one embodiment the function call enables the PIOR for pixel type samples. In an alternate embodiment the function call disables the PIOR for higher-order surface and vertex type samples.

FIG. 7B illustrates an embodiment of a method utilizing the PIOR to render images. In step 710 Programmable Graphics Processing Pipeline 150 is configured, as described further herein, to process pixel and fragment samples with the PIOR enabled. In step 720 a first program is used to render intersecting objects in a scene. In step 730 Programmable Graphics Processing Pipeline 150 is configured to disable the PIOR. In step 740 a second program is used to render non-intersecting objects in the scene. An API can be used by an application to control the state of the PIOR. The API is executed by Host Processor 114 and includes a function call that is used to configure Programmable Graphics Pipeline 150 to either enable or disable the PIOR for each sample type. In one embodiment the function call can be issued with one or more bits asserted where each bit is used to enable the PIOR for a sample type. Conversely, the function call may be issued with one or more of the bits negated to disable the PIOR for one or more of the sample types. In an alternate embodiment, the function call can be issued with one or more bits asserted to toggle the state of the PIOR for one or more sample types.

A device driver executed by Host Processor 114 detects that Programmable Graphics Processing Pipeline 150 supports the PIOR and communicates that information to the API. A graphics application executed by Host Processor 114 can issue the function call to configure Programmable Graphics Processing Pipeline 150 within Graphics Processor 105 to process pixel and fragment samples ignoring position hazards, by enabling the PIOR. In one embodiment the function call communicates with Graphics Processor 105 via the device driver to modify a flag or bits in a register that is readable by Programmable Graphics Pipeline 150 and the flag or bits control the state of the PIOR.

When images are rendered with PIOR enabled artifacts can be introduced during the rendering of non-opaque primitives. Correct rendering of transparent primitives requires rendering all of the opaque primitives and then rendering depth sorted non-opaque primitives. Because the non-opaque primitives are sorted prior to being received by the graphics processor, any reordering can result in blending artifacts. It is possible to reduce the occurrence of artifacts by enabling and disabling the PIOR during rendering.

FIG. 7C illustrates an embodiment of a method utilizing the PIOR to render images. In step 710 Programmable Graphics Processing Pipeline 150 is configured, as described further herein, to process pixel type samples with the PIOR enabled. In step 725 a first program is used to render opaque objects in a scene. In step 730 Programmable Graphics Processing Pipeline 150 is configured to disable the PIOR. In step 745 a second program is used to render non-opaque objects in the scene. In another example, the first program only renders non-blended opaque objects. In yet another example, the first program only renders non-intersecting opaque objects. In a further example, the first program only renders non-blended and non-intersecting opaque objects.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method of rendering a scene using a graphics processor comprising:
    configuring a multithreaded processing unit within the graphics processor to enable processing of samples independent of an order in which the samples are received;
    processing the samples independent of the order in which the samples are received by the multithreaded processing unit to render at least a portion of the scene; and
    configuring the multithreaded processing unit to disable processing of samples independent of an order in which the samples are received to minimize visual artifacts in the rendered scene by preventing the occurrence of position hazards.

2. The method of claim 1, further comprising:
    processing a portion of the samples in the order in which the samples are received by the multithreaded processing unit.

3. The method of claim 2, wherein the portion of the samples includes samples within intersecting objects.

4. The method of claim 2, wherein the portion of the samples includes samples within coincident objects.

5. A graphics processor for multithreaded execution of program instructions comprising:
    at least one multithreaded processing unit configured to receive samples in a first order to be processed by program instructions associated with at least one thread including:
    a scheduler configured to receive the program instructions, determine availability of source data, and schedule the program instructions for execution to process the samples in a second order independent of the first order;
    a resource tracking unit configured to track the availability of the source data; and
    a dispatcher configured to output the program instructions in the second order to be executed by the at least one multithreaded processing unit.

6. The graphics processor of claim 5, wherein the samples include at least one of vertices, primitives, surfaces, fragments and pixels.

7. The graphics processor of claim 5, further comprising a thread control buffer configured to store program counters, each program counter associated with one of the at least one thread.

8. The graphics processor of claim 5, further comprising an instruction cache configured to store the program instructions.

9. The graphics processor of claim 5, wherein the scheduler is configured to schedule the program instructions for execution to process the samples in a second order where the second order is the same as the first order.

10. The graphics processor of claim 5, wherein the scheduler is configured to schedule the program instructions for execution after ordering the program instructions.

11. The graphics processor of claim 10, wherein the ordering is based on the number of cycles each of the program instructions has been in an instruction window unit.

12. The graphics processor of claim 5, wherein the scheduler is configured to determine availability of computation resources within the at least one multithreaded processing unit.

13. The graphics processor of claim 12, wherein the resource tracking unit is configured to track the availability of the computation resources.

14. The graphics processor of claim 5, wherein the at least one multithreaded processing unit is configured to allocate storage resources to the at least one thread.

15. The graphics processor of claim 5, wherein the at least one multithreaded processing unit is configured to maintain thread state data for the at least one thread.

16. The graphics processor of claim 15, wherein a portion of the thread state data indicates whether the thread is either assigned to a sample or is available to be assigned to a sample.

17. A computing system comprising:
a host processor;
a host memory, the host memory storing programs for the host processor;
a system interface configured to interface with the host processor; and
a graphics processor for multithreaded execution of program instructions Including:
at least one multithreaded processing unit configured to receive samples in a first order to be processed by program instructions associated with at least one thread including:
a scheduler configured to receive the program instructions, determine availability of source data, and schedule the program instructions for execution in a second order independent of the first order;
a resource tracking unit configured to track the availability of the source data; and
a dispatcher configured to output the program instructions in the second order to be executed by the at least one multithreaded processing unit.

18. The computing system of claim 17, wherein the host memory is configured to interface with the system interface.

19. The computing system of claim 17, wherein the host memory is configured to directly interface with the host processor.

20. A method of processing a first program instruction associated with a first thread and a second program instruction associated with a second thread comprising:
receiving a first sample to be processed by the first program instruction associated with the first thread before receiving a second sample to be processed by the second program instruction associated with the second thread;
determining that first source data required to process the first program instruction are not available;
determining that second source data required to process the second program instruction are available; and
dispatching the second program instruction to process the second sample in an execution unit prior to dispatching the first program instruction to process the first sample in the execution unit.

21. The method of claim 20, further comprising determining that a position hazard does not exist between a position of the first sample and a position of any other sample being processed by a program instruction in the execution unit.

22. The method of claim 21, further comprising, prior to the determining that a position hazard does not exist, disabling processing of samples independent of an order in which the samples are received using a programmable mode.

23. The method of claim 20, further comprising determining that a position hazard does not exist between a position of the second sample and a position of any other sample being processed by a program instruction in the execution unit.

24. The method of claim 20, further comprising:
retaining as state information the position of the first sample received to be processed by the first program instruction associated with the first thread; and
updating the state information when the first thread has completed execution.

25. The method of claim 20, further comprising:
retaining as state information the position of the second sample received to be processed by the second program instruction associated with the second thread; and
updating the state information when the second thread has completed execution.

26. The method of claim 20, further comprising allocating storage resources to the second thread.

27. The method of claim 20, further comprising allocating storage resources to the first thread.

28. A method of using a function call to configure a graphics processor comprising:
detecting that a multithreaded processing unit within the graphics processor supports processing of samples independent of an order in which the samples are received for at least one sample type;
issuing a function call to configure the multithreaded processing unit to enable processing of samples independent of an order in which the samples are received for the at least one sample type; and
ending the function call during rendering of an output image to disable processing of samples independent of the order In which they are received to prevent image artifacts due to position hazards.

29. A method as claimed in claim 28 wherein the multithreaded processing unit is configured to process several output pixel locations distributed across the output image.

30. A method as claimed in claim 28 wherein the multithreaded processing unit is configured to process several adjacent output pixel locations within the output image.

31. A method as claimed in claim 28 wherein the multithreaded processing unit is configured to process regions of four adjacent pixels arranged in a square with the squares located within the output image.

32. A method as claimed in claim 28 wherein a separate one of the function calls may be issued for each of the multithreaded processing unit.

33. A method as claimed in claim 1 wherein each thread of the multithreaded processing unit may be separately configured to selectively enable or disable processing of samples independent of the order in which the samples are received.

* * * * *

UNITED STATES PATENT AND TRADEMARK OFFICE
CERTIFICATE OF CORRECTION

PATENT NO. : 7,015,913 B1 Page 1 of 1
APPLICATION NO. : 10/608346
DATED : March 21, 2006
INVENTOR(S) : John Erik Lindholm, Rui M. Bastos and Harold Robert Feldman Zatz It is certified that error appears in the above-identified patent and that said Letters Patent is hereby corrected as shown below:

In column 17, Claim 17, line 35, please delete "Including" and insert --including--.

In column 18, Claim 28, line 47, please delete "In" and insert --in--.

Signed and Sealed this

Twelfth Day of December, 2006

JON W. DUDAS
*Director of the United States Patent and Trademark Office*